Sheet 1. 8 Sheets.

Cyrenus Wheeler Jr.

No. 876. Grain & Grass Harvester.

Reissued Jan 3, 1860.

Cyrenus Wheeler. Jr.

Grain & Grass Harvesters.

Reissued Jan. 3. 1860

No. 876.

Sheet 2. 3 Sheets

3 Sheets
Sheet 3
C. Wheeler Jr
Mower.
No 876 Reissued Jan. 3, 1860.
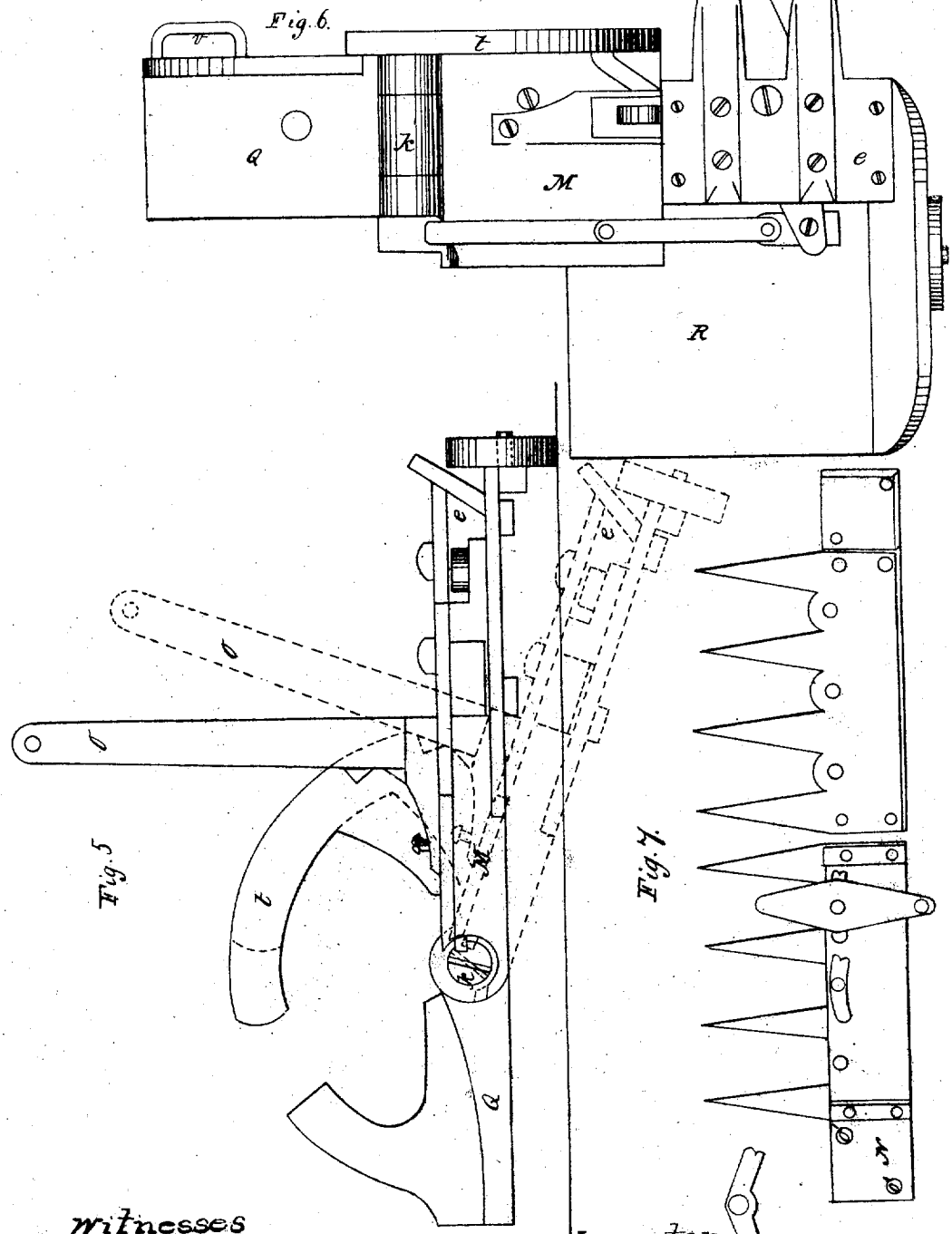
Witnesses
Geo. H. Pfefferman
L. Cohen
Inventor
Cyrenus Wheeler Jr

UNITED STATES PATENT OFFICE.

CYRENUS WHEELER, JR., OF POPLAR RIDGE, NEW YORK.

IMPROVEMENT IN GRAIN AND GRASS HARVESTERS.

Specification forming part of Letters Patent No. 12,044, dated December 5, 1854; Reissue No. 876, dated January 3, 1860.

DIVISION B.

*To all whom it may concern:*

Be it known that I, CYRENUS WHEELER, Jr., of Poplar Ridge, in the county of Cayuga and State of New York, have invented certain new and useful Improvements in Grain and Grass Harvesters; and I do hereby declare the following to be a full, clear, and exact description of the same, reference being had to the accompanying drawings, making a part thereof, in which—

Figure 1:
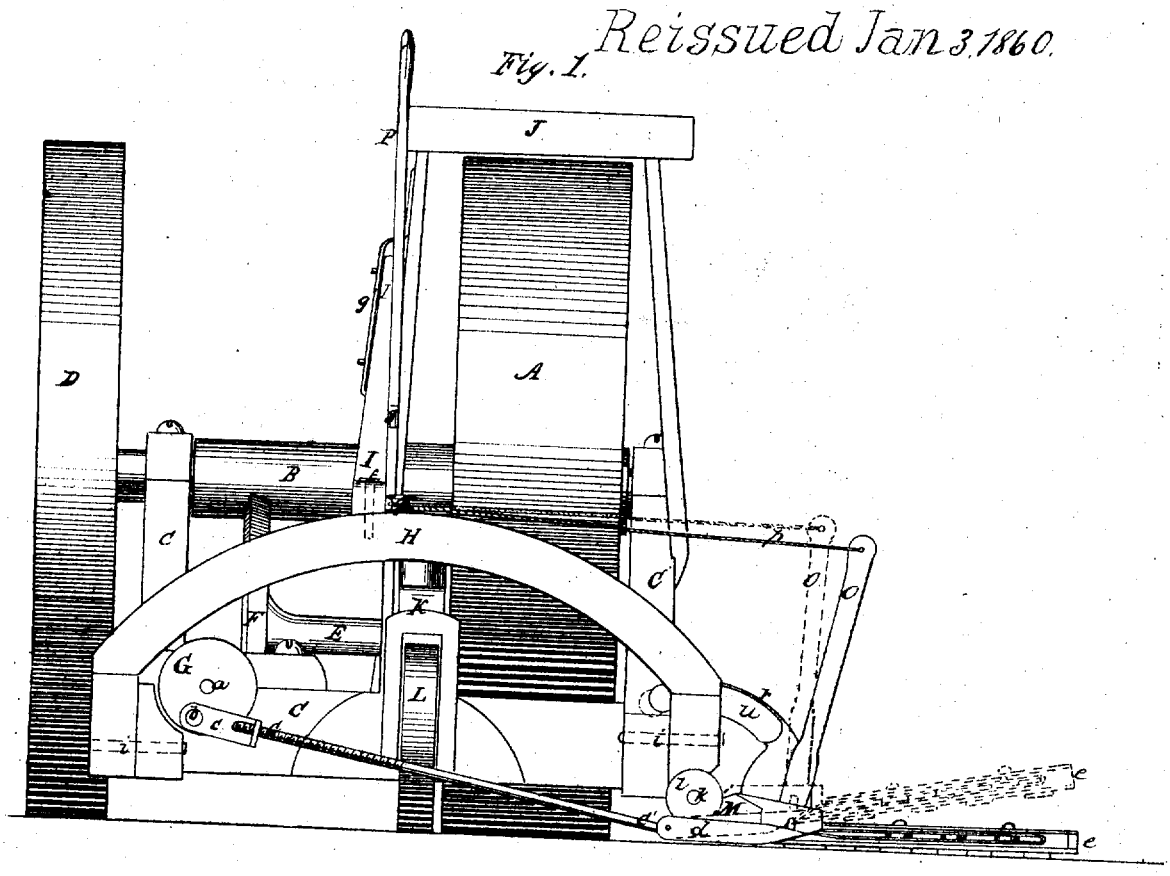
Figure 3:
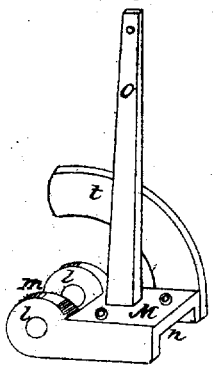
Figure 7:
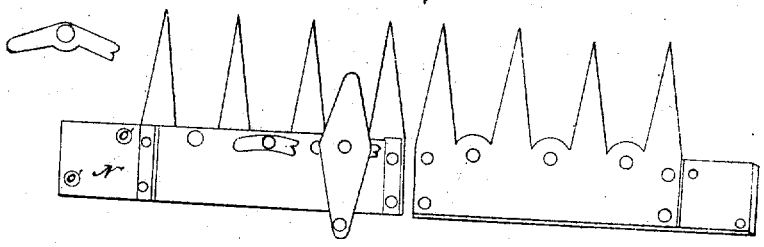
Figure 2:
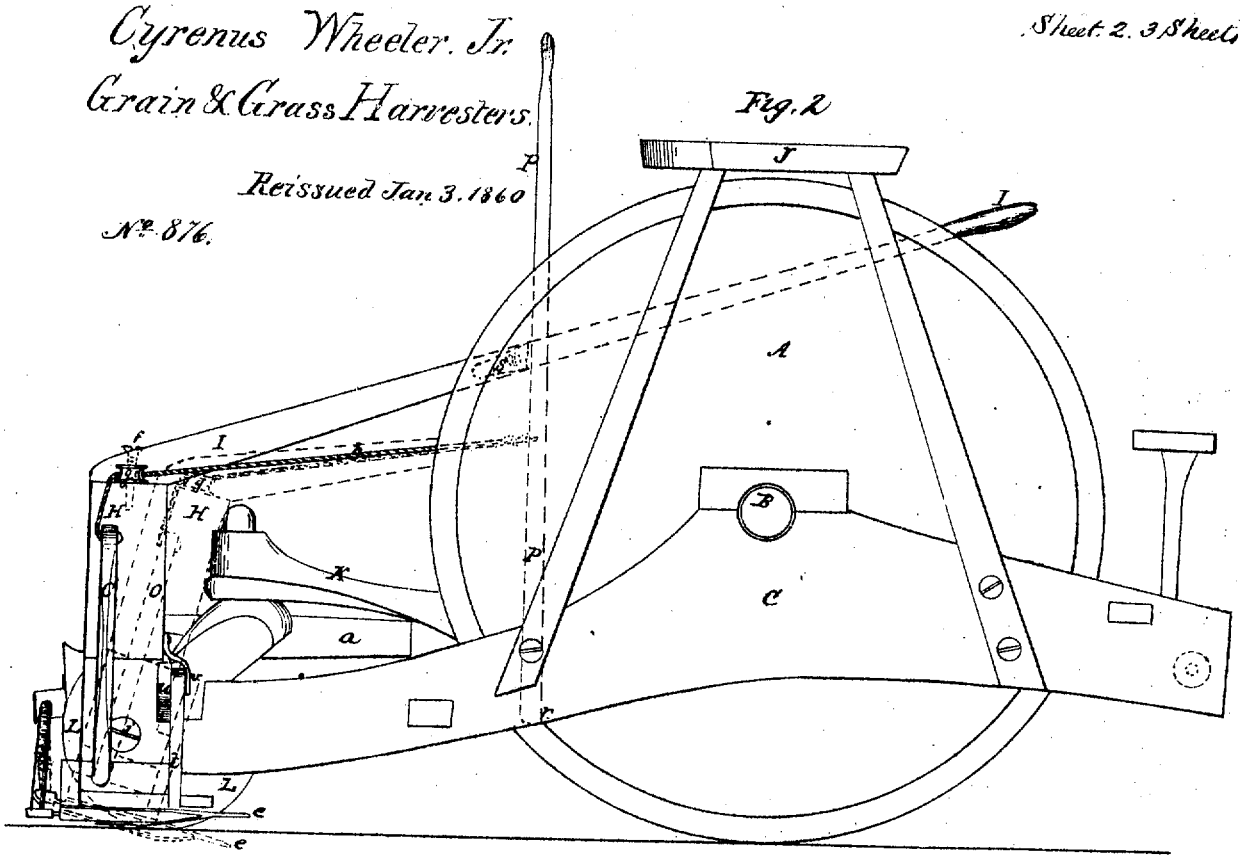
Figure 5:
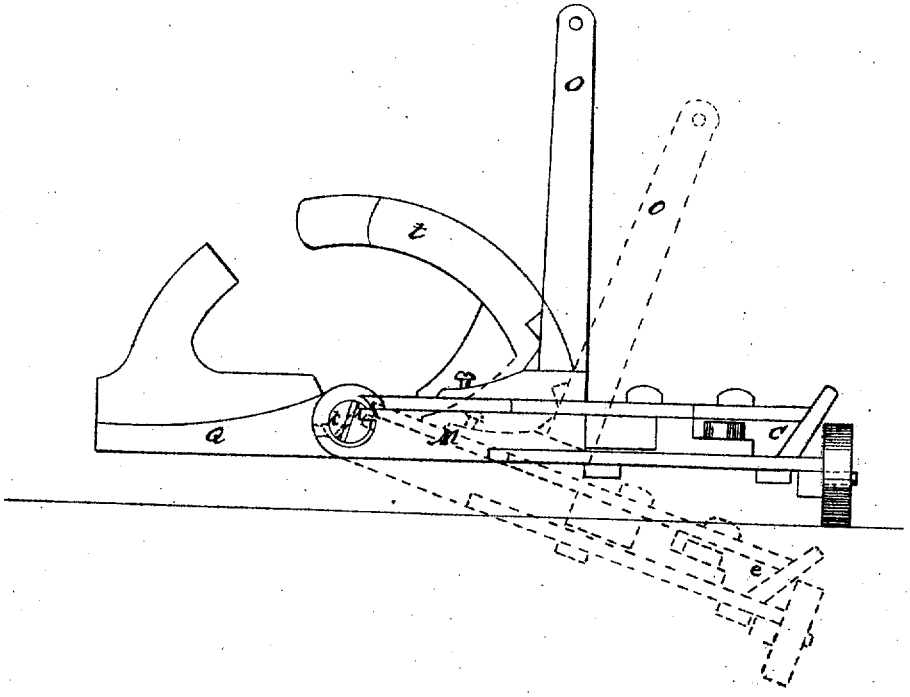

Figure 1 represents a rear elevation of a harvesting-machine for grain or grass. Fig. 2 represents a side elevation of the same from the right-hand or grain side of the machine. Figs. 3 and 4 represent detached portions of the machine. Figs. 5 and 6 represent on an enlarged scale, respectively, an elevation and plan of the finger-bar and its hinged connection to allow it to accommodate itself to the surface of the ground or to be raised up therefrom, as circumstances may require. Fig. 7 represents a cutting apparatus connected to the finger-bar.

Similar letters of reference, where they occur in the several figures, denote like parts of the machine in all of them.

To adapt a harvesting-machine to the mowing of grass, it is necessary that the finger and cutter bar should travel close to the ground; and not only this, but that they should receive all their vertical movements from the ground over which they pass, and not be influenced by the projections or depressions over which the supporting-wheels are passing; but as the finger and cutter bar must receive their advancing movement from the main frame, their connection therewith must be such as to allow them to have a free vertical movement both above and below the plane over which the wheels are passing. To effect this object is the purpose of this part of my invention; and the nature of my invention consists in a floating finger-bar that freely rises or falls at its outer end, while it and the frame to which it is hinged closely hug the ground at its other end, and so hinged by one of its ends only at or near the grain side of the main frame as that it shall conform to the undulations of the ground over which it is passing, freely rising at its hinged end with the portion of the frame to which it is connected above, or falling below the plane on which the main carrying or driving wheels are passing, while its loose end is uncontrolled by the frame.

To enable others skilled in the art to make and apply my invention, I will proceed to describe the same in connection with the accompanying drawings.

A is a main supporting and driving wheel turning with the axle B, and D is a carrying-wheel on the same axle, but loose thereon. The main frame C is supported by these wheels and this axle in the usual manner. At or near the grain side of the main frame is secured a shoe, M, by a hinged joint, *k*, so that said shoe may freely swing up and down above and below the point to which it is hinged; and to this shoe the finger-bar is bolted by one of its ends, leaving the other end perfectly free to move over and on the ground, conforming to the undulation thereof without being influenced by the motions of the main frame except to advance the finger-bar. To this shoe M may be connected a cord or chain, *p*, which, passing around a suitable pulley, *g*, to bring it into a proper direction, is then fastened to a lever, P, near the driver's seat, so that the driver from his seat may at any time turn up the outer end of the finger-bar to carry it over any obstructions in its path. By taking up or letting out the cord or chain *p* the extent to which the finger-bar may drop is accurately adjusted, while it is free to rise above that line to accommodate itself to the surface over which it is drawn. I thus make what I term a "floating finger-bar"—that is, a finger-bar hinged by one of its ends to the grain side of the main frame, or so connected thereto through a hinge-joint as that while it is advanced over the ground by the advancing movement of the main frame it will be free to rise at its outer end to accommodate itself to the surface of the ground over which it passes, and at its inner or hinged end rising and falling with the free movement of the main frame, the caster-wheel L allowing the main frame and the end of the finger-bar hinged to it to run close to or on the ground or to be held up by it, as circumstances may require.

Having thus fully described the nature and object of this part of my invention, what I claim in this patent is—

In combination with the main frame of a grass-harvesting machine, a finger-bar so hinged by one of its ends only to the grain side of the main frame as that said finger-bar as it is advanced by means of its hinge shall be free to rise above and fall below the plane on which the carrying or driving wheels are passing, substantially as described.

CYRENUS WHEELER, JR.

Witnesses:
THOS. H. UPPERMAN,
E. COHEN.